Aug. 7, 1934.  A. S. VAN HALTEREN  1,968,976
METHOD OF FORMING COMPOSITE BRAKE DRUMS
Filed April 15, 1932
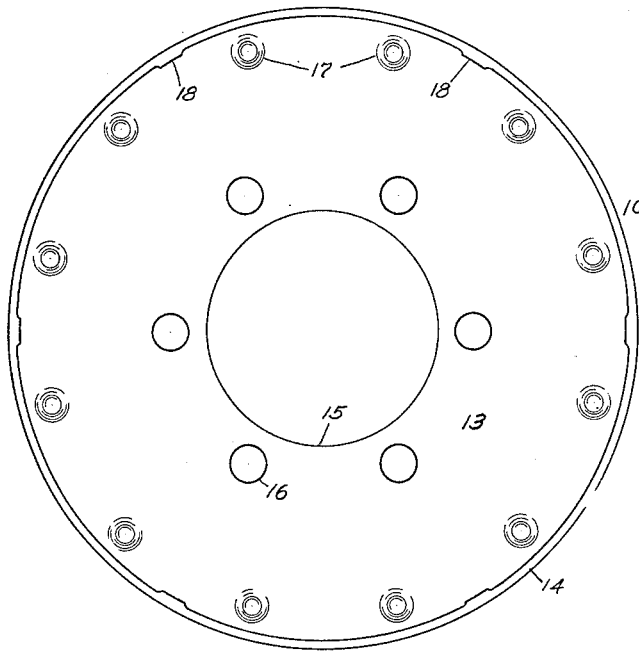
Fig. I
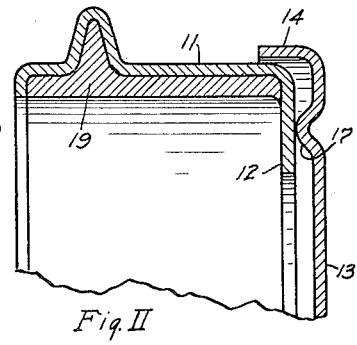
Fig. II
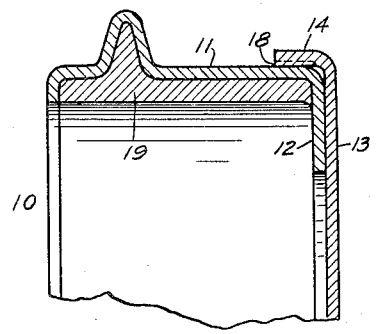
Fig. III
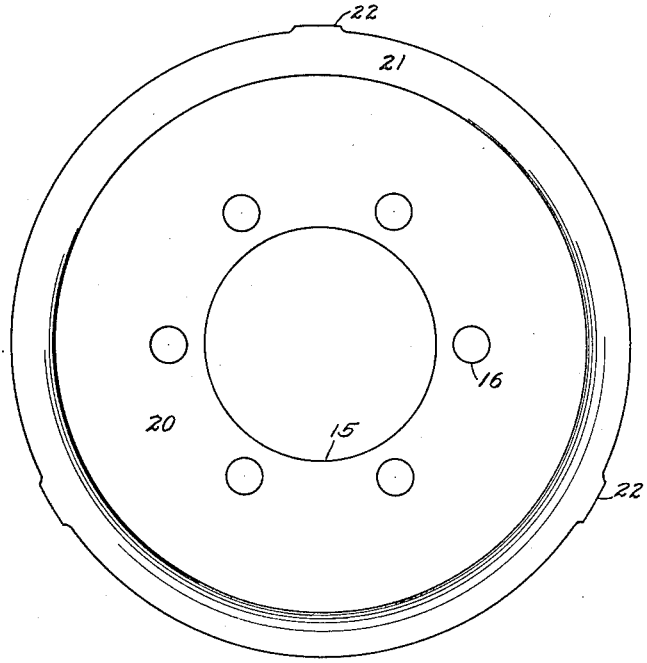
Fig. IV
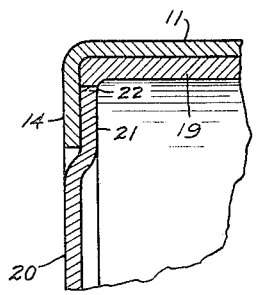
Fig. V
INVENTOR.
Andrew S. Van Halteren.
BY
Carroll R. Jaber
HIS ATTORNEY.

Patented Aug. 7, 1934

1,968,976

UNITED STATES PATENT OFFICE 1,968,976

METHOD OF FORMING COMPOSITE BRAKE DRUMS

Andrew S. Van Halteren, East Lansing, Mich., assignor to Motor Wheel Corporation, Lansing, Mich., a corporation of Michigan Application April 15, 1932, Serial No. 605,385

10 Claims. (Cl. 219—10)

This invention relates to a method of forming composite brake drums. The principal objects of the invention are: the provision of a novel method of welding a brake drum web to a brake ring; the provision of a method of securing a brake ring to a brake web by welding whereby there will be a uniform leakage of electric current during the welding process; the provision of a method of securing a brake ring to a brake web whereby the web and ring are held in substantially true concentric relation while they are being secured together; and the provision of a method of securing a brake ring to a brake web whereby a composite brake drum of unusual strength and durability is formed therefrom.

While heretofore brake drums have usually been formed as a unitary structure from malleable metal by means of stamping or die drawing, many attempts, some of which have been successful, have been made to form a composite brake drum from a brake ring and a brake web. Since the functions of the web portion and braking portion of a brake drum are substantially different, there are many advantages to be obtained by forming a composite brake drum from a brake ring and a brake web. A composite brake drum may embody metal in the brake ring which is especially suitable as a braking surface while the brake web may embody metal especially designed to carry the stresses to which it is subjected and be of suitable formation to rapidly dissipate the heat generated in the braking ring.

The present novel method of welding a brake drum web to a brake ring comprises forming a plurality of welding projections or bubbles on the surface of one of these parts, placing the projections against the surface of the other part, and passing an electric current through the said projections and the surface with which they are in contact. In this manner a smooth weld of great strength is secured.

The brake drum backing plate utilized in forming the composite brake drum is conventionally provided with a laterally extending peripheral flange which encircles the adjacent edge of the brake ring when these parts are assembled for welding. The function of the peripheral flange is to increase the strength and rigidity of the brake drum assembly. Accordingly, contact is required between the flange and the brake ring. However, the points of contact between the flange and the brake ring serve to permit leakage of electrical current during the welding process. This leakage is not objectional as long as it remains constant, in which event the current used for welding can be properly controlled to obtain a satisfactory weld.

With modern production methods it is very difficult to hold the outside diameter of the brake ring and the inside diameter of the peripheral flange to such close limits as will result in a uniform contact between these parts when assembled. This results in a variance in the leakage of electric current during the welding process whereby uniformly satisfactory welds cannot be obtained. This difficulty is overcome by providing suitable projections on the inner surface of the peripheral flange whereby contact is made between the flange and brake ring at a limited number of relatively widely separated points with the result that the amount of leakage is controlled within definite limits.

Considerable difficulty is normally experienced in holding the brake drum web and brake ring in true concentric relation while securing them together to form a composite brake drum. The projections on the inner surface of the peripheral flange also serve to eliminate this difficulty by providing means for centering these parts while they are being welded.

For a better understanding of the invention reference may now be had to the accompanying drawing, in which:

Fig. I is a front view in elevation of one form of brake web which may be used in practicing the invention;

Fig. II is a partial sectional view through a composite brake drum embodying the brake web illustrated in Fig. I prior to the projection welding operation;

Fig. III is a partial sectional view of the composite brake drum shown in Fig. II illustrating the appearance thereof after the projection welding operation and showing the centering and leakage projection carried by the peripheral flange of the brake web;

Fig. IV is a front view in elevation of a modified form of brake web which may be used in practicing the present invention; and Fig. V is a partial sectional view through a composite brake drum embodying the web shown in Fig. IV and illustrating the centering and leakage projection carried by the web.

The present invention contemplates the formation of a composite brake drum 10, as shown in Figs. II and III by securing to a brake ring 11 having an inturned flange 12 at one edge thereof, a brake web 13 having a laterally extending peripheral flange 14. The web is provided with a central opening 15 through which a vehicle axle may extend and a plurality of securing bolt openings 16 by means of which the web is secured to a vehicle wheel. The web is also provided, as shown in Fig. I, with a plurality of welding projections or bubbles 17 circumferentially spaced about the body thereof adjacent its periphery. The laterally extending peripheral flange 14 carries a plurality of centering or current leakage projections 18 positioned equidistant from the adjacent welding projections 17. The projections 18 are preferably of relatively minute size and may be formed alternately relatively large and small. For example, it has been found that very satisfactory results are obtained by providing projections of .005 inch and .01 inch and arranging them alternately about the peripheral flange 14.

The brake ring and brake web are formed so that the internal circumference of the laterally extending flange 14 will be slightly greater than the external circumference of the brake ring 11. Accordingly, when these parts are assembled in the relation illustrated in Fig. II at least some of the projections 18 contact with the external circumference of the ring 11 and in no event can a substantial portion of the inner surface of the peripheral flange 14 contact with the external surface of the brake ring 11. The web is therefore held in substantially true concentric relation to the ring 11 and when an electric current is passed through the ring flange 12 and the brake web 13 at the point of contact between the flange and the welding projection 17, there is a slight loss of electric current by reason of the contact between the projections 18 and the external surface of the ring 11. Were it not for these projections 18, the peripheral flange 14 of the web might contact the external surface of the ring 11 throughout a substantial arc and thereby cause sufficient leakage of electric current to prevent the formation of satisfactory welds at the desired points.

The modified form of web 20 illustrated in Fig. IV is substantially identical to the web shown in Fig. I except that it is not provided with a laterally extending peripheral flange and preferably is formed with fewer centering or leakage projections. As best shown in Fig. V the web is formed with a peripheral flange 21 lying in a plane substantially parallel to the body thereof. A plurality of centering and leakage projections 22 are provided at the outer extremity of the flange 21. The web 20 is assembled with a brake ring 11 as shown in Fig. V with at least some of the projections 22 contacting the inner surface of the ring 11 or the brake material secured thereto. The web 20 is secured to the ring 11 by means of passing an electric current through the web flange 21 and the ring flange 14 to form welds, or in any other suitable manner. In the event that the web 20 is secured to the ring 11 by means of projection welding the projections 22 carried by the flange 21 serve to control the amount of leakage of electric current and in any event these projections serve to center the web 20 with respect to the brake ring 11.

As shown in Figs. II, III and V, the inner surface of the brake ring 11 may have a cast braking surface centrifugally fused thereto. In each of the structures shown it is apparent that a substantial surface contact is provided between the ring flange and the web whereby to obtain a strong joint therebetween and that suitable provision is made to prevent actual movement of the ring with respect to the web whereby to loosen or destroy the connection between these parts.

While only the preferred methods of practicing the invention have been shown and described it should be understood that the invention is not limited thereto but is co-extensive with the scope of the appended claims.

I claim:

1. The method of securing a brake ring to a brake web to form a composite brake drum which comprises forming the brake web with a limited number of peripherally spaced projections, assembling the web and ring in concentric relation with portions thereof in parallel and adjacent relation and with the aforesaid peripheral projections contacting the brake ring, and passing an electric current through the web and ring at predetermined points of contact between the parallel portions thereof remote from said projections whereby to effect a plurality of welds therebetween, the aforesaid peripheral projections serving to separate the ring and web and control the amount of leakage of electric current during the welding process.

2. The method of securing a brake ring to a brake web to form a composite brake drum which comprises forming the brake web with a plurality of peripherally spaced projections, assembling the web and ring in concentric relation with portions thereof in parallel and adjacent relation, and with said peripheral projections contacting the brake ring whereby to center the same with respect to the brake web, and passing an electric current through the parallel portions of the ring and web at desired points remote from said projections whereby to effect a plurality of welds therebetween.

3. The method of forming a composite brake drum which comprises providing a cylindrical brake ring having an inturned flange at the edge thereof, providing a peripherally flanged brake web having a plurality of circumferentially spaced apart projections in the body thereof and a limited number of relatively small projections on the peripheral flange, assembling the web and ring with the first mentioned projections in contact with the brake ring flange and the projections on the peripheral flange in contact with the surface of the brake ring, and passing an electric current through the ring flange and the web at the points of contact between the projections on the latter and the ring flange whereby to effect a plurality of welds between the ring flange and web.

4. The method of forming a composite brake drum which comprises providing a brake ring with an inturned flange at one extremity, providing a brake web with a peripheral flange, forming a plurality of spaced apart alternately relatively small and large projections in the peripheral flange, assembling the brake ring and web with the peripheral flange of the latter encircling the former whereby at least some of the aforesaid projections contact the brake ring, and passing an electric current through the body of the web and the ring flange at predetermined points whereby to effect a plurality of welds therebetween.

5. The method of forming a composite brake drum which comprises providing a brake ring having a finaged edge, providing a brake web having a peripheral flange, forming a plurality of circumferentially spaced apart welding projections in the body of the web, forming a plurality of centering projections in the peripheral flange of the web at points equidistant from adjacent welding projections, assembling the web and ring with the peripheral flange of the former encircling the ring whereby at least some of the centering projections contact the ring and all of the welding projections contact the ring flange, and passing an electric current through the ring flange and the web at the point of contact of the projections formed in the latter with the ring flange.

6. The method of forming a composite brake drum which comprises providing a brake ring having a flanged edge, providing a brake web having a laterally extending peripheral flange, forming a plurality of circumferentially spaced apart centering projections in the said peripheral flange, assembling the web and ring with the peripheral flange of the former encircling the latter whereby at least some of the centering projections contact the brake ring, and securing the body of the web to the ring flange.

7. The method of forming a composite brake drum which comprises providing a brake ring having a flanged edge, providing a brake web having a peripheral flange carrying a plurality of circumferentially spaced apart centering projections, assembling the ring and web in concentric relation whereby at least some of the centering projections contact the ring, and securing the peripheral flange of the web to the ring flange.

8. The method of forming composite brake drums which comprises providing a brake ring and a brake drum web with a plurality of spaced apart relatively small centering projections and a plurality of spaced apart relatively large welding projections, assembling the ring and web in concentric relation with the contact therebetween limited to said projections, and passing an electric current through each of the welding projections whereby to weld the ring and web together.

9. The method of forming a composite brake drum which comprises providing a brake ring having a flanged edge, providing a brake web having a peripheral flange carrying a plurality of spaced apart alternately relatively small and large centering projections, assembling the ring and web in concentric relation whereby at least some of the said projections contact the ring, and fastening the web to the ring flange.

10. The method of forming a composite brake drum which comprises providing a cylindrical brake ring, providing a brake drum web, forming a plurality of centering projections in the web adjacent its periphery, assembling the web and ring in concentric relation with at least some of said centering projections contacting the ring, and fastening the web to the ring at points remote from said centering projections.

ANDREW S. VAN HALTEREN.